(12) United States Patent
Hsu et al.

(10) Patent No.: US 9,678,541 B2
(45) Date of Patent: *Jun. 13, 2017

(54) PIVOT SHAFT TRANSMISSION DEVICE

(71) Applicant: FIRST DOME CORPORATION, New Taipei (TW)

(72) Inventors: An Szu Hsu, New Taipei (TW); Wang Jui Lee, New Taipei (TW); Chung Yi Lin, New Taipei (TW); Ya Ching Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 238 days.

This patent is subject to a terminal disclaimer.

(21) Appl. No.: 14/516,864

(22) Filed: Oct. 17, 2014

(65) Prior Publication Data

US 2016/0048175 A1    Feb. 18, 2016

(30) Foreign Application Priority Data

Aug. 12, 2014  (TW) .............................. 103127692 A

(51) Int. Cl.
  *E05D 3/06*    (2006.01)
  *G06F 1/16*    (2006.01)
(52) U.S. Cl.
  CPC ...... *G06F 1/1681* (2013.01); *E05Y 2900/606* (2013.01)
(58) Field of Classification Search
  CPC .. G06F 1/1681; E05Y 2900/606; E05D 3/122
  See application file for complete search history.

(56) References Cited

U.S. PATENT DOCUMENTS

| | | | | |
|---|---|---|---|---|
| 8,559,623 B2* | 10/2013 | Chen | ................... | H04M 1/0237 16/327 |
| 9,309,705 B2* | 4/2016 | Hsu | ...................... | G06F 1/1681 |
| 9,310,849 B2* | 4/2016 | Hsu | ......................... | E05D 3/122 |
| 2015/0138713 A1* | 5/2015 | Onda | ..................... | G06F 1/1679 361/679.27 |
| 2016/0047156 A1* | 2/2016 | Hsu | ......................... | F16H 21/44 16/239 |
| 2016/0102487 A1* | 4/2016 | Kuramochi | ............... | E05D 3/12 361/679.27 |

* cited by examiner

*Primary Examiner* — Victor Batson
*Assistant Examiner* — Matthew Sullivan
(74) *Attorney, Agent, or Firm* — Rosenberg, Klein & Lee

(57) ABSTRACT

A pivot shaft transmission device provides a security system and is easy to assemble. The pivot shaft transmission device includes at least one rotary shaft, a drive section movable with the rotation of the rotary shaft, a driver (transversely) movable along a rail between a first position and a second position, a turning unit having a first end connected with the driver and a second end, and a transmission unit assembled with the second end of the turning unit. The transmission unit includes a first section, a second section and at least one elastic body assembled with each other. When the turning unit is swung, the transmission unit is driven to (longitudinally) move to drive a connection section and a carrier body for lifting or lowering a substrate body or a frame in accordance with the operation mode of an electronic apparatus.

36 Claims, 7 Drawing Sheets

PIVOT SHAFT TRANSMISSION DEVICE

BACKGROUND OF THE INVENTION

1. Field of the Invention

The present invention relates generally to a pivot shaft transmission device, and more particularly to a pivot shaft transmission device including at least one rotary shaft, a drive section, a driver, a turning unit and a transmission unit assembled with each other. When the turning unit is swung, the transmission unit is driven to drive a carrier body for lifting or lowering a substrate body.

2. Description of the Related Art

There are various electronic apparatuses provided with covers or display screens, such as mobile phones, notebooks, PDA, and electronic books. The covers or display screens are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a conventional transmission device has been developed to lift or lower a frame in rotation of the display module and/or the apparatus body module so as to protect and prevent the keyboard disposed on the apparatus body module from being mis-touched. FIG. 1 shows the conventional transmission device.

As shown in FIG. 1, a (dual) rotary shaft B and a case C enclosing the rotary shaft B are mounted on the apparatus body module A1 of an electronic apparatus A. The rotary shaft B has an eccentric section B1, which is eccentrically rotatable with the rotation of the rotary shaft. A transmission support B2 is connected with the eccentric section B1 and assembled with a carrier body B4 via a connection section B3. When a user operates the display module or the apparatus body module A1 to rotate and open the display module by 180 degrees to 360 degrees for use as a tablet, the eccentric section B1 of the rotary shaft pushes the transmission support B2 to make the connection section B3 and the carrier body B4 (longitudinally) move. At this time, the carrier body B4 pushes a frame A2 disposed on the apparatus body module A1 to lift or lower the frame A2. When lifted, the height of the frame A2 is higher than that of the keyboard A3 to serve as a support for the electronic apparatus. Also, the frame serves to protect and prevent the keyboard A3 disposed on the apparatus body module A1 from being mis-touched.

With respect to the operation and structural design of the above transmission device, in order to drivingly connect the transmission support B2 with the eccentric section B1 of the rotary shaft, the case C must be formed with a notch C1 for the transmission support B2 to pass and move through. Obviously, the notch C1 will affect the entire appearance and visual design of the electronic apparatus A. Moreover, dust or the like is apt to accumulate on the components inside the case C. This is not what we expect.

With respect to the assembling process and structural design of the above transmission device, the connection section B3 must be provided with a claw section B5 for latching with the transmission support B2. Also, a base support A4 is disposed under bottom of the apparatus body module A1 and is provided with an L-shaped restriction plate A5. The restriction plate A5 is assembled with the protrusion section B6 formed on the connection section B3, whereby the connection section B3 is restricted on the base support A4 and movable with the transmission support B2. As well known by those who are skilled in this field, the cooperative structures between the transmission support B2, the connection section B3 and the base support A4 are relatively complicated. As a result, it is difficult and troublesome to assemble these components.

The conventional pivot shaft transmission device and the relevant connection components thereof have some shortcomings in use and structural design that need to be overcome. It is therefore tried by the applicant to provide a pivot shaft transmission device to eliminate the shortcomings existing in the conventional pivot shaft transmission device so as to widen the application range and facilitate the assembling process of the pivot shaft transmission device. For example, in comparison with the conventional transmission device, the pivot shaft transmission device of the present invention is applicable to notebook computer or small-size electronic apparatus to meet the requirements of lightweight and thin design. The pivot shaft transmission device of the present invention provides a security system and keeps the case enclosing the rotary shaft complete. This overcomes the problems of the conventional transmission device that the entire appearance and visual design of the electronic apparatus are affected and dust or the like is apt to accumulate on the components inside the case. In addition, the present invention solves the problems of the conventional transmission device that the cooperative structures are relatively complicated so that it is difficult and troublesome to assemble these components.

SUMMARY OF THE INVENTION

It is therefore a primary object of the present invention to provide a pivot shaft transmission device, which provides a security system and is easy to assemble. The pivot shaft transmission device includes at least one rotary shaft, a drive section movable with the rotation of the rotary shaft, a driver transversely movable along a rail between a first position and a second position, a turning unit having a first end connected with the driver and a second end, and a transmission unit assembled with the second end of the turning unit. The transmission unit includes a first section, a second section and at least one elastic body assembled with each other. When the turning unit is swung, the transmission unit is driven to (longitudinally) move to drive a connection section and a carrier body for lifting or lowering a substrate body or a frame in accordance with the operation mode of an electronic apparatus.

In the above pivot shaft transmission device, the rotary shaft includes a pivoted section assembled with a torque module and a fixed section connected with an apparatus body module or a display module. The drive section is disposed on the rotary shaft between the pivoted section and the fixed section. The driver is formed with a guide section corresponding to the drive section. The guide section is assembled with the drive section, whereby the guide section is movable with the rotation of the drive section to drive the driver to move.

In the above pivot shaft transmission device, the rotary shaft includes a first rotary shaft and a second rotary shaft, The first rotary shaft is pivotally connected with the apparatus body module of the electronic apparatus, while the second rotary shaft is pivotally connected with the display module of the electronic apparatus. A link unit is disposed between the first and second rotary shafts for synchronously rotating the first and second rotary shafts.

In the above pivot shaft transmission device, the transmission unit includes a first section and a second section for together driving the connection section to move. The first section has an arm and a pivoted end connected with the arm and pivotally connected with the second end of the turning unit. The second section has a plate body and an assembling end connected with the plate body. The assembling end is connected with the connection section. The plate body is provided with a guide section, whereby the first and second sections are movable relative to each other. The elastic body is mounted between the first and second sections to provide an elastic move range between the first and second sections. Substantially, the first and second sections together pull the connection section and the carrier body to lift or lower the substrate body or the frame.

During the process that the transmission unit pulls the connection section and the carrier body to lift the frame, incase the substrate body or the frame is hindered from being lifted or lowered due to external force or mis-operation, the elastic body permits the first section to move with the swing of the turning unit relative to the second section to extend the elastic body. That is, the elastic body provides an elastic move range between the first and second sections to avoid damage of the transmission mechanism due to external force.

The present invention can be best understood through the following description and accompanying drawings, wherein:

DETAILED DESCRIPTION OF THE PREFERRED EMBODIMENTS

Figure 1:
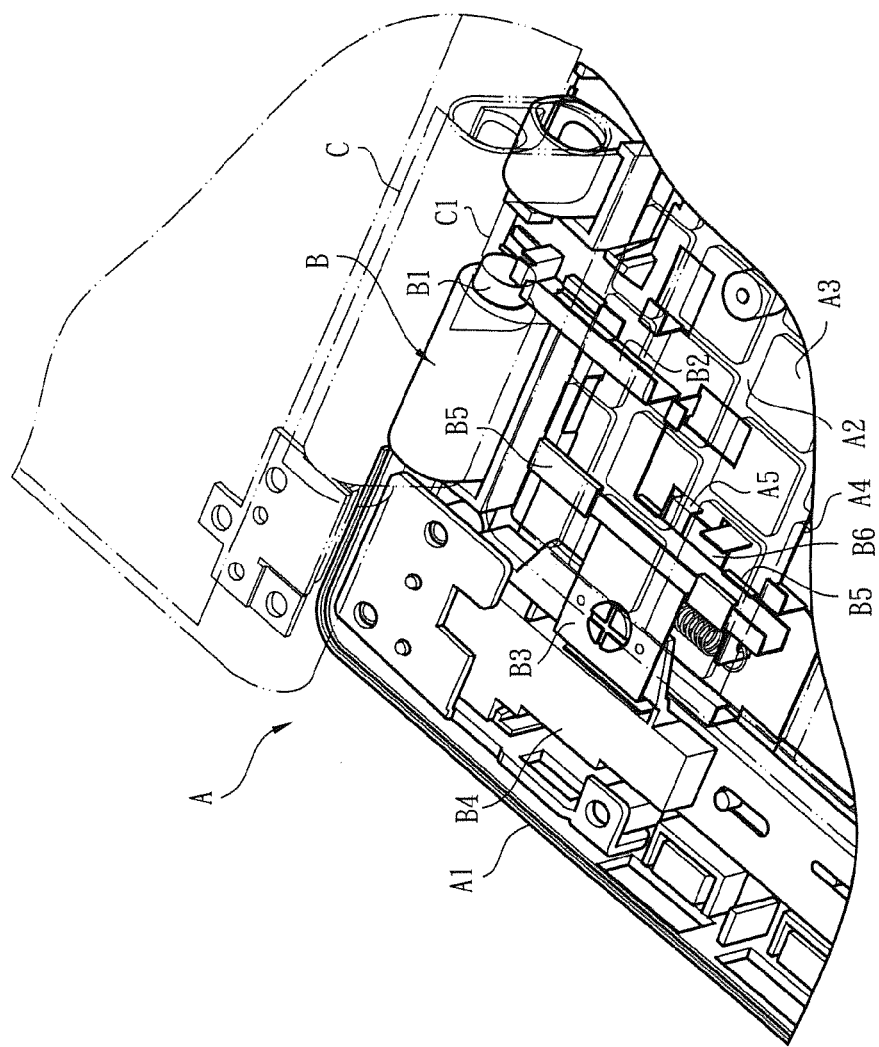
FIG. 1 is a perspective view of a conventional pivot shaft transmission device, in which the phantom lines show that a keyboard is positioned on a base support.
Figure 2:
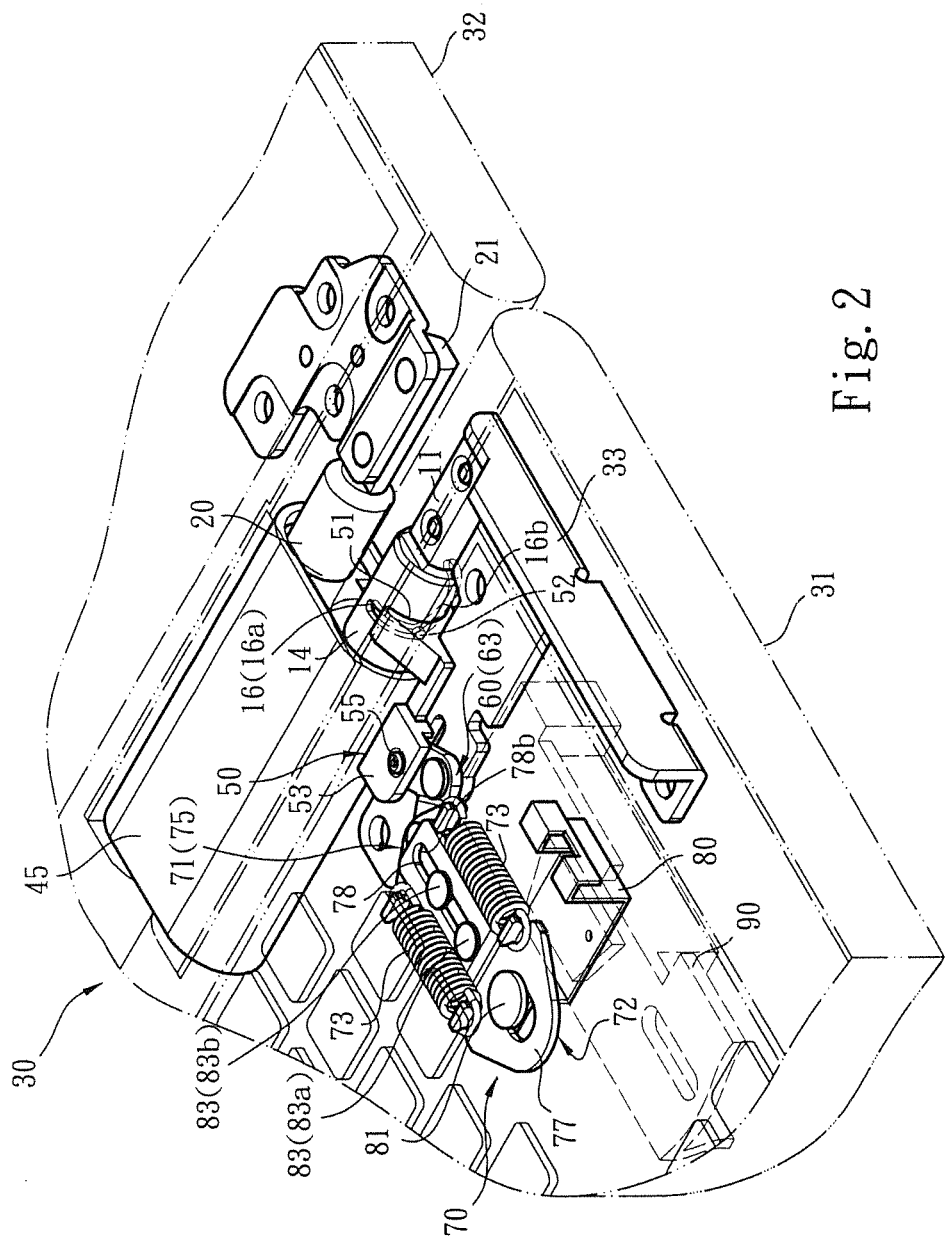
FIG. 2 is a perspective assembled view of the present invention, showing the cooperative structures of the first and second shafts, the drive section, the driver, the turning unit and transmission unit.
Figure 3:
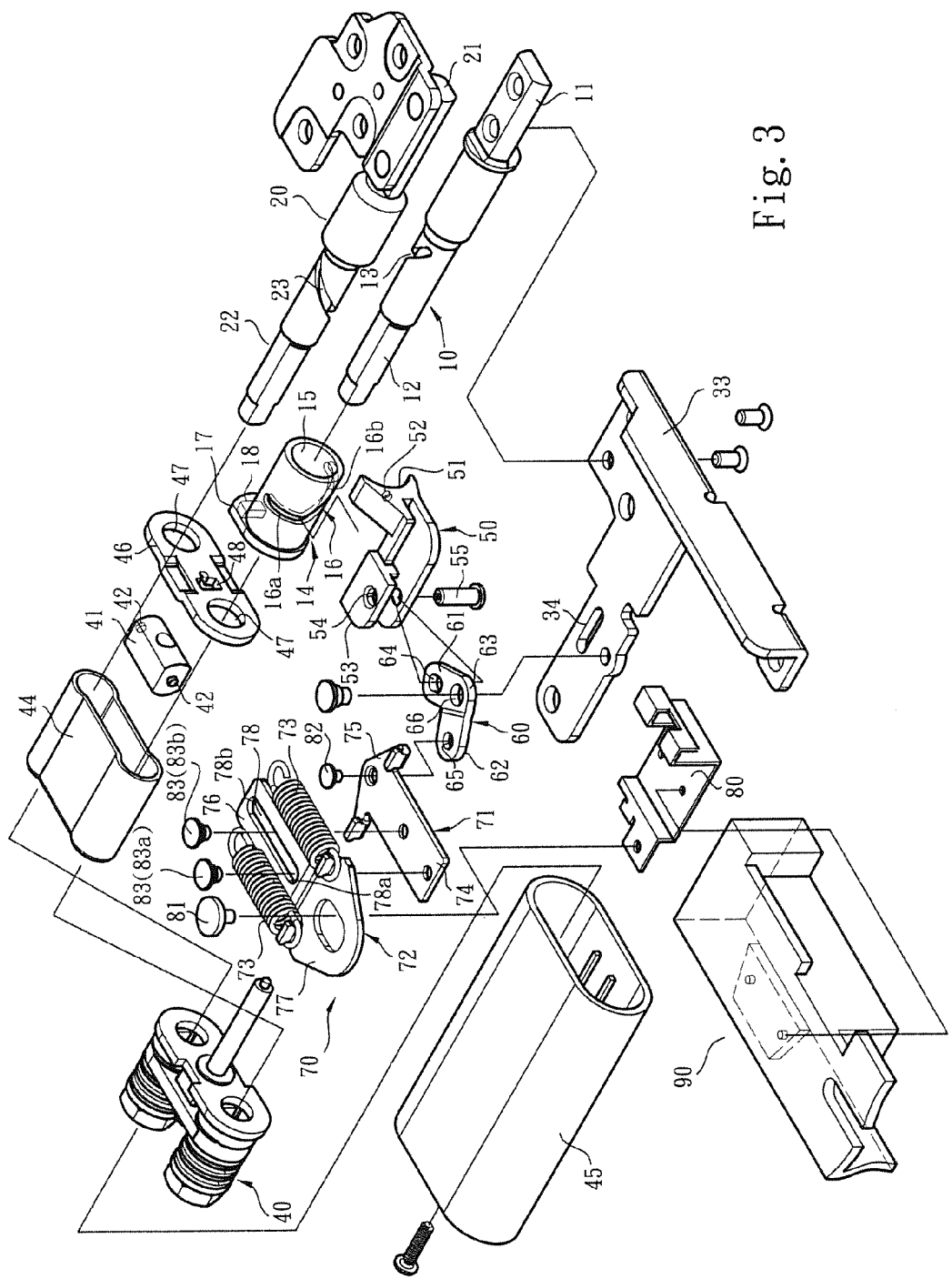
FIG. 3 is a perspective exploded view of the present invention, showing the cooperative structures of the first and second shafts, the drive section, the driver, the turning unit, the transmission unit and the connection section.

Please refer to FIGS. 2 and 3. The pivot shaft transmission device of the present invention has a dual-shaft mechanism assembled with an electronic apparatus (such as a computer) for illustration. The pivot shaft transmission device includes a first rotary shaft 10 and a second rotary shaft 20. Each of the first and second rotary shafts 10, 20 has a fixed section 11, 21 and a pivoted section 12, 22. The fixed section 11 of the first rotary shaft is connected with an apparatus body module 31 of an electronic apparatus 30 or connected with a fixing plate 33 of the apparatus body module 31. The fixed section 21 of the second rotary shaft is connected with a display module 32 of the electronic apparatus 30. The pivoted sections 12, 22 of the first and second rotary shafts 10, 20 are (respectively) assembled with torque modules 40. Accordingly, when the action force applied to the apparatus body module 31 or the display module 32 by a user for rotating the same disappears, the apparatus body module 31 or the display module 32 are immediately located. The torque modules 40 pertain to prior art and thus will not be further described hereinafter.

In this embodiment, a link unit 41 is disposed between the first and second rotary shafts 10, 20 for synchronously rotating the first and second rotary shafts 10, 20. To speak more specifically, a section of each of the first and second rotary shafts 10, 20 in adjacency to the pivoted section 12, 22 is formed with a spiral groove 13, 23. Protrusion sections 42 are disposed at two ends of the link unit 41 corresponding to the spiral grooves 13, 23. The protrusion sections 42 are respectively inlaid in the spiral grooves 13, 23. Accordingly, when a user operates and rotates the display module 32, the second rotary shaft 20 is driven to rotate. At the same time, the link unit 41 is forced to drive the first rotary shaft 10 and the apparatus body module 31 to rotate.

As shown in the drawings, a subsidiary case 44 encloses the spiral grooves 13, 23 of the first and second rotary shafts and the link unit 41. The subsidiary case 44 together with a restriction plate 46 and the torque modules 40 is installed in a case 45. The restriction plate 46 is formed with two holes 47 for the pivoted sections 12, 22 of the first and second rotary shafts 10, 20 to pass through respectively. After the pivoted sections 12, 22 pass through the subsidiary case 44, the pivoted sections 12, 22 are assembled with the torque modules 40.

In this embodiment, a drive section 14 is disposed between the fixed section 11 and the pivoted section 12 of the first rotary shaft 10. The drive section 14 is a tubular body having a shaft hole 15 in which the first rotary shaft 10 is fitted. A driving section 16 is formed on the surface of the drive section 14. The driving section 16 is a rail or groove structure including an (annular) straight section 16a and a (spiral) oblique section 16b connected with the straight section 16a.

As shown in FIG. 3, one end of the drive section 14 is provided with a shoulder section 17 and an insertion block 18 formed on the shoulder section 17. The insertion block 18 is inlaid in a hole 48 formed on the restriction plate 46. Therefore, when a user operates and rotates the display module 32 and the second rotary shaft 20, the link unit 41 is forced to drive the first rotary shaft 10 and the apparatus body module 31 to rotate. At the same time, the case 45 and the restriction plate 46 also drive the drive section 14 to rotate.

FIG. 3 also shows that a driver 50 is assembled with the driving section 16 of the drive section 14. In this embodiment, the driver 50 is formed with an arched section 51 corresponding to the tubular body of the drive section 14 and a guide section 52 disposed on the arched section 51 corresponding to the driving section 16 of the drive section 14. The guide section 52 has the form of a key and is inlaid in the driving section 16. When the apparatus body module 31 and the display module 32 are positioned in the closed position, the guide section 52 is positioned in a start point of the straight section 16a of the driving section. Therefore, the end point of the straight section 16a means the junction between the straight section 16a and the oblique section 16b.

As shown in the drawings, the driver 50 includes a holder section 53 and a bolt hole 54 formed on the holder section 53. The holder section 53 is assembled on the fixing plate 33 of the apparatus body module 31. To speak more specifically, the fixing plate 33 is provided with a slot-shaped rail 34. A bolt 55 is passed through the bolt hole 54 of the holder section to assemble the holder section on the rail 34, permitting the driver 50 or the holder section 53 to move along the rail 34. The position where the bolt hole 54 of the holder section and the bolt 55 are assembled on the rail 34 is defined as a first position. The other end of the rail 34, to which the holder section 53 and the bolt 55 are moved is defined as a second position.

It should be noted that with the axis of the rail 34 serving as a reference axis, the moving direction of the driver 50 or the holder section 53 along the rail 34 is defined as a transverse move. Accordingly, the moving direction normal to the transverse move is defined as a longitudinal move.

FIG. 3 shows that a turning unit 60 is pivotally connected with the driver 50 or the bolt hole 54 of the holder section. The turning unit 60 is an L-shaped plate body having a first end 61, a second end 62 and a middle section 63 connected between the first and second ends 61, 62. The first end 61 of the turning unit is formed with an assembling hole 64. The bolt 55 is passed through the assembling hole 64 to connect the turning unit to the bolt hole 54 of the holder section of the driver 50. Accordingly, the turning unit 60 is movable with the driver 50 or the holder section 53 along the rail 34 of the fixing plate 33. The second end 62 is formed with an assembling hole 65 for pivotally connecting with a transmission unit 70. The middle section 63 is formed with an assembling hole 66 for pivotally connecting on the fixing plate 33 of the apparatus body module 31 as a rotational fulcrum or swinging fulcrum.

In this embodiment, the transmission unit 70 includes a first section 71, a second section 72 and at least one elastic body 73 assembled with each other. The first section 71 of the transmission unit has an arm 74 and a pivoted end 75 connected with the arm 74. The pivoted end 75 is pivotally connected with the second end 62 of the turning unit via the bolt 82. The second section 72 has a plate body 76 and an assembling end 77 connected with the plate body 76. The assembling end 77 is assembled with a connection section 80 via a pin member 81.

As shown in FIGS. 2 and 3, the second section 72 is provided with a guide section 78 in the axial direction of the plate body 76, whereby the first and second sections 71, 72 are movable relative to each other. The guide section 78 is defined with a head end 78a and a rear end 78b. That is, the arm 74 of the first section 71 is provided with at least one restrictor 83 assembled in the guide section 78 of the second section 72 (or the plate body 76). As shown in the drawings, there are two restrictors 83 in the form of bolts or pin members for preventing the first and second sections 71, 72 from deflecting when moving relative to each other.

In this embodiment, the restrictors 83 include a first restrictor 83a and a second restrictor 83b. In the beginning, the first restrictor 83a abuts against the head end 78a of the guide section 78, while the second restrictor 83b is positioned in the guide section 78 between the head end 78a and the rear end 78b.

As shown in the drawings, the elastic body 73 is a spiral spring. Two ends of the elastic body 73 are respectively affixed to the pivoted end 75 of the first section and the assembling end 77 of the second section, whereby the elastic body 73 is mounted between the first and second sections 71, 72 to provide an elastic move range for the first and second sections 71, 72.

In this embodiment, the connection section 80 drivable by the transmission unit 70 is a board body having two sides. A pin member 81 is disposed on one side to connect with the assembling end 77 of the transmission unit 70. A carrier body 90 is affixed to or connected with the other side of the connection section 80. The carrier body 90 is disposed on the apparatus body module 31 for pushing a substrate body or a frame to ascend/descend (not shown) as in the conventional technique.

Figure 4:
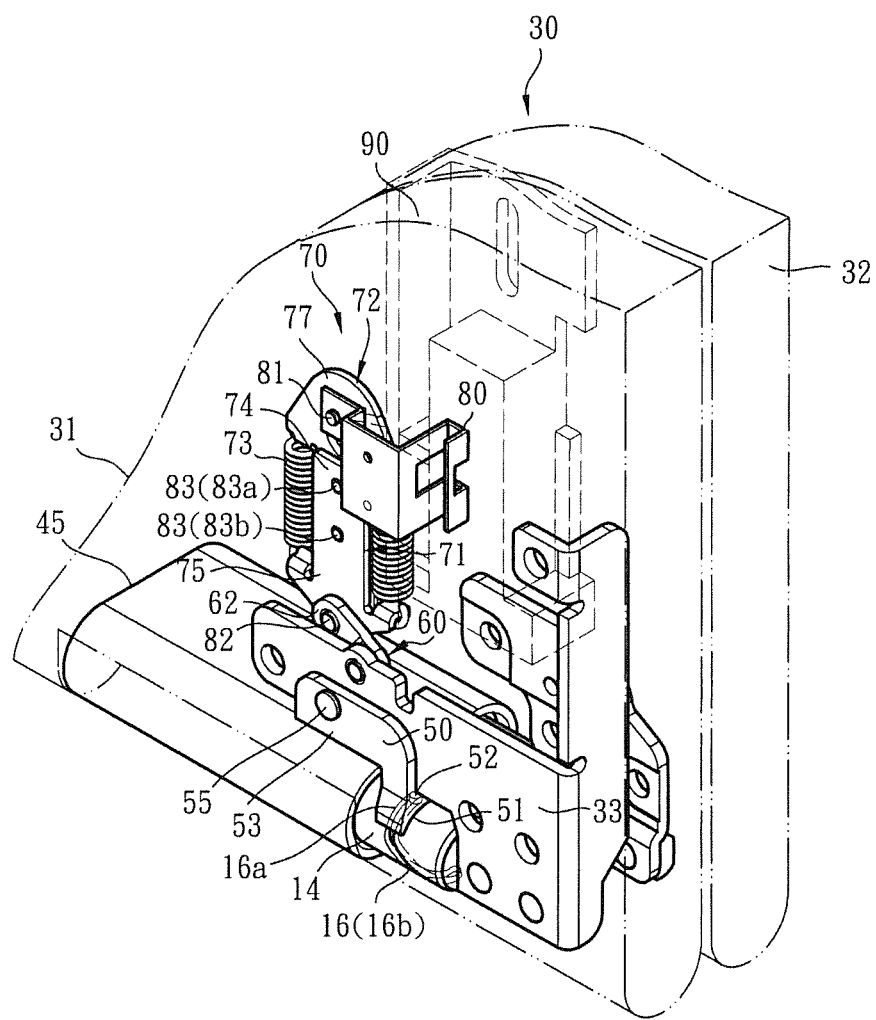
FIG. 4 is a perspective assembled view of the present invention, showing that the display module is closed onto the apparatus body module and showing the cooperative structures of the transmission device.
Figure 5:
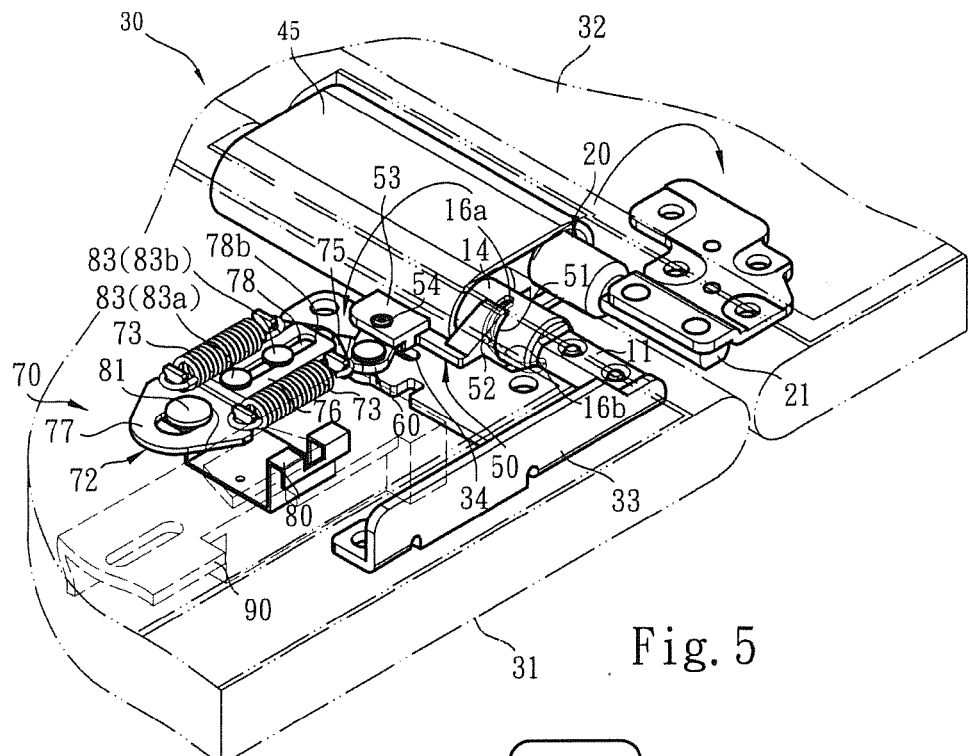
FIG. 5 is a perspective assembled view of the present invention, showing that the first and second rotary shafts are respectively rotated by 90 degrees and the apparatus body module and the display module are 180-degree opened and showing the cooperative structures of the drive section, the driver, the turning unit, the transmission unit and the connection section.
Figure 5A:
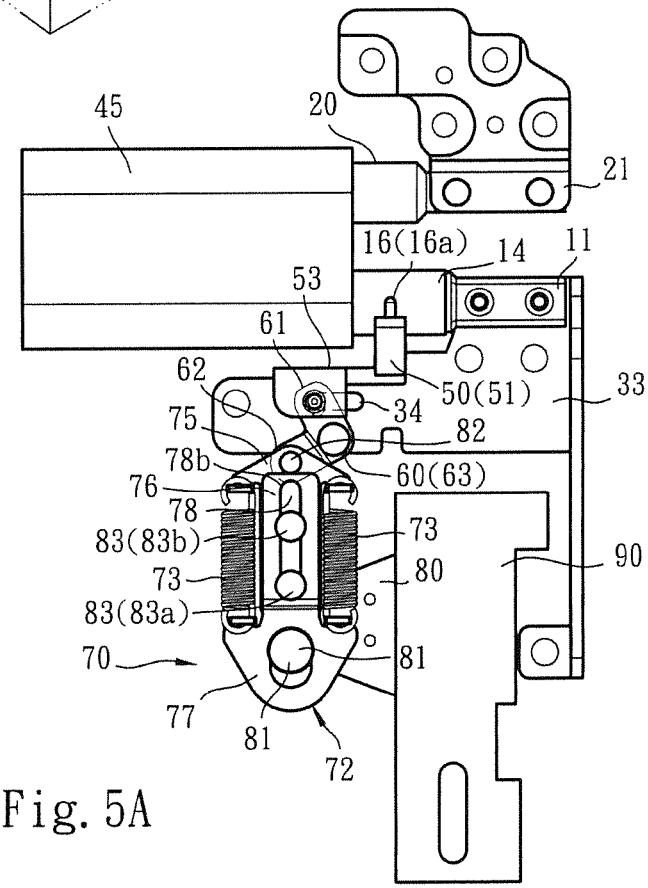
FIG. 5A is a plane view according to FIG. 5.

Please refer to FIGS. 4, 5 and 5A. FIG. 4 shows that the apparatus body module 31 and the display module 32 are positioned in the closed position and the guide section 52 is positioned in the start point of the straight section 16a of the driving section. As shown in FIGS. 5 and 5A, when a user operates the display module 32 and the second rotary shaft 20 to rotate by 90 degrees, the apparatus body module 31 and the first rotary shaft 10 are also relatively rotated by 90 degrees. At the same time, the case 45 and the restriction plate 46 drive the drive section 14 to rotate on the first rotary shaft 10. Therefore, the guide section 52 of the driver is relatively moved to the end point of the straight section 16a of the driving section.

Figure 6:
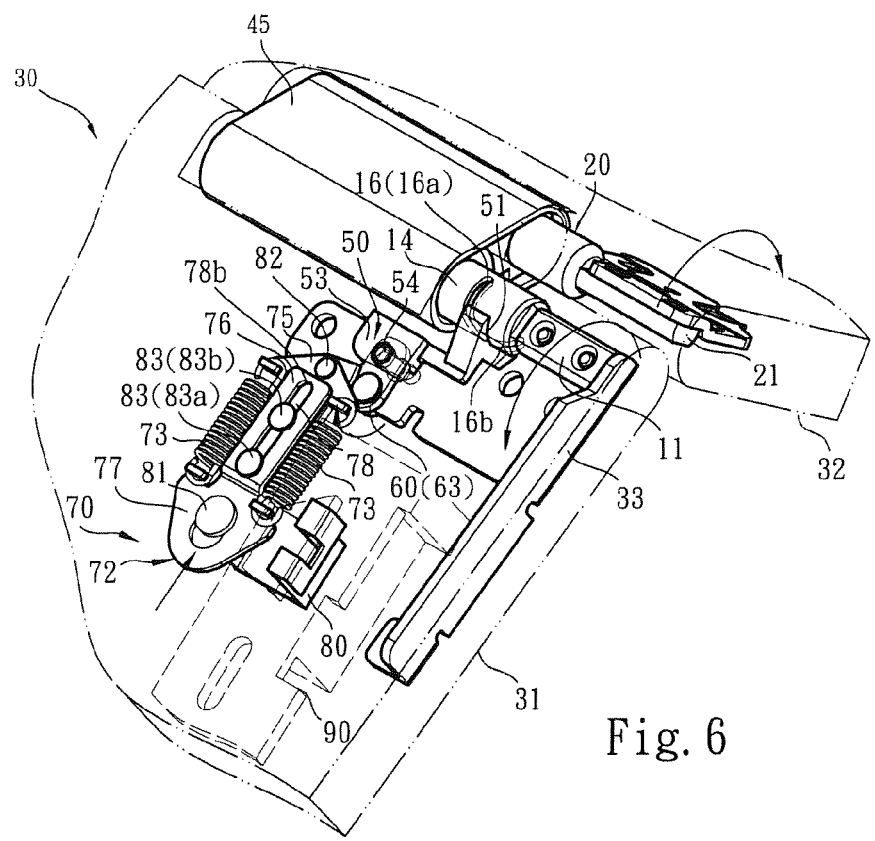
FIG. 6 is another perspective assembled view of the present invention, showing that the first and second rotary shafts are respectively rotated by 135 degrees and the apparatus body module and the display module are 270-degree opened and showing the cooperative structures of the drive section, the driver, the turning unit, the transmission unit and the connection section.
Figure 6A:
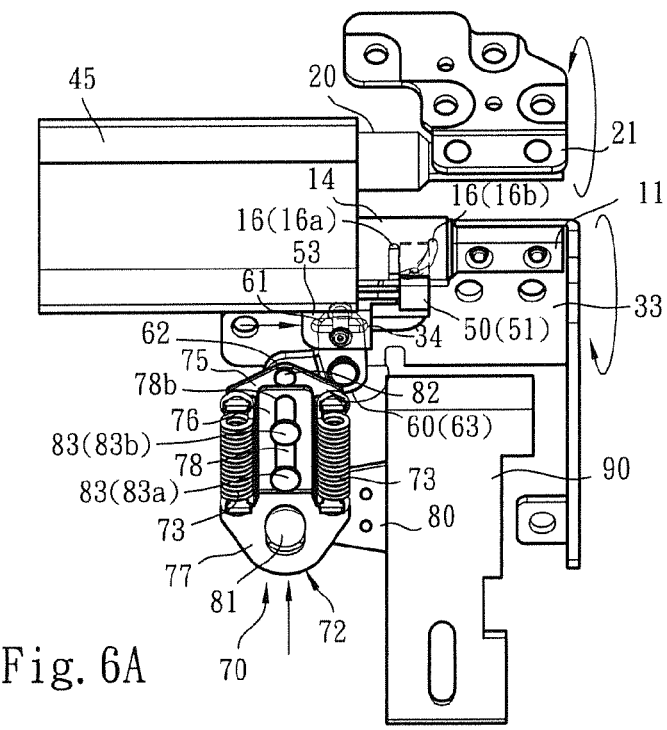
FIG. 6A is a plane view according to FIG. 6.

Please refer to FIGS. 6 and 6A, which show that the user operates the display module 32 and the second rotary shaft 20 to rotate by 135 degrees and the apparatus body module 31 and the first rotary shaft 10 are also relatively rotated by 135 degrees. At the same time, the case 45 and the restriction plate 46 drive the drive section 14 to rotate on the first rotary shaft 10. Therefore, the guide section 52 of the driver is relatively moved from the end point of the straight section 16a of the driving section into the oblique section 16b. Accordingly, the driver 52 is transversely moved along the rail 34 from the first position toward the second position (the right side of the drawing). At this time, the turning unit 60 is swung to push the transmission unit 70 to move toward the upper side of the drawing. Due to the preset elastic force of the elastic body 73, the first and second sections 71, 72 of the transmission unit 70 together pull the connection section 80 and the carrier body 90 to (longitudinally) move. Accordingly, the carrier body 90 can lift the substrate body or the frame as in the conventional technique.

Figure 7:
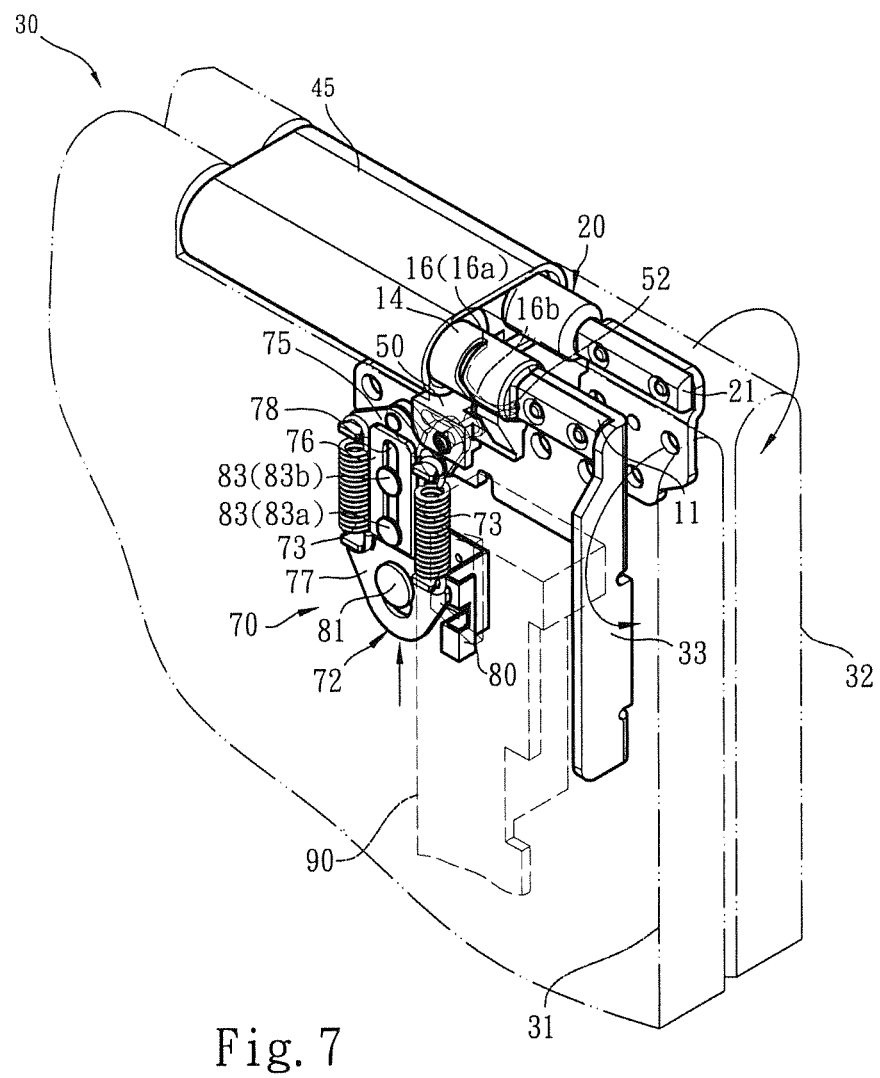
FIG. 7 is still another perspective assembled view of the present invention, showing that the first and second rotary shafts are respectively rotated by 180 degrees and the apparatus body module and the display module are 360-degree opened and showing the cooperative structures of the drive section, the driver, the turning unit, the transmission unit and the connection section.

Please refer to FIG. 7, which shows that the user operates the display module 32 and the second rotary shaft 20 to rotate by 180 degrees and the apparatus body module 31 and the first rotary shaft 10 are also relatively rotated by 180 degrees. (That is, the apparatus body module 31 and the display module 32 or the first and second rotary shafts 10, 20 are totally relatively rotated by 360 degrees). At the same time, the case 45 and the restriction plate 46 drive the drive section 14 to rotate on the first rotary shaft 10. Therefore, the guide section 52 of the driver is relatively moved to the end point of the oblique section 16b of the driving section. Accordingly, the driver 52 is moved along the rail 34 to reach the second position. At this time, the turning unit 60 is swung and the transmission unit 70 continuously pulls the connection section 80 and the carrier body 90, whereby the carrier body 90 lifts the substrate body or the frame to a highest position, which is higher than the position of the keyboard. Under such circumstance, the frame serves as a support for bearing the electronic apparatus. Moreover, the frame serves to protect and prevent the keyboard disposed on the apparatus body module from being mis-touched.

It should be noted that during the process that the transmission unit 70 pulls the connection section 80 and the carrier body 90 to lift the frame, in case the operator mis-presses the frame and fails to smoothly lift the frame and the mis-press force is greater than the preset elastic force of the elastic body 73, the second section 72 will be unable to move with the first section 71. Under such circumstance, when the first section 71 is moved relative to the second section 72 with the swing of the turning unit 60, the restrictor 83 is driven to move toward the rear end 78b of the guide section 78 to extend the elastic body 73. The allowable extension range of the elastic body 73 should be larger than the distance by which the restrictor 83 (or the second restrictor 83b) moves to the rear end 78b of the guide section 78. Also, the displacement amount of the first section 71 should be at least equal to the distance by which the restrictor 83 (or the second restrictor 83b) moves to the rear end 78b of the guide section 78. That is, the elastic body 73 allows an elastic move range between the first and second sections 71, 72 to together establish a security system to prevent the transmission mechanism from being damaged by external force.

It should be noted that when the user operates the display module 32 and the second rotary shaft 20 and the apparatus body module 31 and the first rotary shaft 10 to rotate from the 180-degree position to the closed position, the case 45 and the restriction plate 46 will drive the drive section 14 to rotate on the first rotary shaft 10. Therefore, the guide section 52 of the driver is relatively moved from the end point of the oblique section 16b toward the straight section 16a of the driving section. Accordingly, the holder section 53 and the bolt 55 of the driver 52 are moved from the second position to the first position. At this time, the turning unit 60 is swung to push the transmission unit 70 to move to the lower side of the drawing. In this case, the first and second sections 71, 72 of the transmission unit 70 push the pin member 81, the connection section 80 and the carrier body 90 to move back to their home positions so as to lower the frame.

In comparison with the conventional device, the pivot shaft transmission device of the present invention meets the requirements of lightweight and thin design and has the following advantages:

1. The pivot shaft and the relevant components have been redesigned to be different from the conventional device. Also, the use and operation mode of the pivot shaft transmission device is changed to be different from the conventional device. For example, the rotary shaft (or the first rotary shaft 10) is provided with a drive section 14 in cooperation with the driver 50, the turning unit 60 and the transmission unit 70. The first section 71 of the transmission unit 70 has the arm 74 assembled in the guide section 78 of the second section 72. The elastic body 73 provides an elastic move range for the transmission unit 70. The first and second sections 71, 72 of the transmission unit 70 can drive the connection section 80 and the carrier body 90 to move. The above arrangement overcomes the problem of the conventional device that the case cannot keep complete and must be formed with a large notch for assembling with the transmission unit. This not only affects the entire appearance and visual design of the electronic apparatus, but also makes it impossible to minify the volume of the case. As a result, dust or the like is apt to accumulate on the components inside the case to affect the transmission function.

2. The driver 50, the turning unit 60, the transmission unit 70 and the connection section 80 can be easily assembled. In contrast, in the conventional device, the connection section B3 is provided with a claw section B5 latched with the transmission support B2. The base support A4 of the bottom of the apparatus body module is provided with an L-shaped restriction plate A5 assembled with the protrusion section B6 of the connection section B3. Such structure is relatively complicated so that it is difficult and troublesome to assemble these components. The present invention solves these problems of the conventional device.

3. In practice, the apparatus body module 31 and the display module 32 can be equipped with one single rotary shaft assembled with the drive section 14, the driver 50, the turning unit 60 and the transmission unit 70 to achieve the same transmission effect. Also, the (spiral) angle of the straight section 16a and the oblique section 16b of the driving section 16 of the drive section can be adjusted in accordance with actual requirements so as to change the operation mode and angle of the apparatus body module 31 and the display module 32 and the transmission device.

In conclusion, the pivot shaft transmission device of the present invention is designed with a novel structure for effectively transmitting power and is advantageous over the conventional device.

The above embodiments are only used to illustrate the present invention, not intended to limit the scope thereof. Many modifications of the above embodiments can be made without departing from the spirit of the present invention.

What is claimed is:

1. A pivot shaft transmission device comprising:
   at least one rotary shaft having a fixed section and a pivoted section, the pivoted section being assembled with a torque module;
   a drive section disposed on the rotary shaft, the drive section being provided with a driving section;
   a driver having a guide section assembled with the driving section and a holder section, the holder section being movable along a rail between a first position and a second position;
   a turning unit including a first end pivotally connected with the holder section of the driver, a second end and a middle section connected between the first and second ends;
   a transmission unit having a pivoted end pivotally connected with the second end of the turning unit and an assembling end pivotally connected with a connection section; and
   at least one elastic body disposed between the pivoted end and the assembling end, when the rotary shaft is rotated, the drive section, the driver and the turning unit being moved in response to the rotation of the rotary shaft, whereby the transmission unit drives the connection section to move.

2. The pivot shaft transmission device as claimed in claim 1, wherein the transmission unit includes a first section and a second section for together driving the connection section to move, the pivoted end being disposed on the first section, the first section having an arm connected with the pivoted end, the pivoted end being pivotally connected with the second end of the turning unit via a bolt, the assembling end being disposed on the second section, the second section having a plate body connecting with the assembling end, the assembling end being connected with the connection section via a pin member, the plate body of the second section being provided with a guide section, the guide section having a head end and a rear end, the arm of the first section being provided with at least one restrictor, the restrictor being assembled in the guide section of the second section.

3. A pivot shaft transmission device comprising,
at least one rotary shaft having a fixed section and a pivoted section, the pivoted section being assembled with a torque module;
a drive section disposed on the rotary shaft, the drive section being provided with a driving section;
a driver having a guide section assembled with the driving section and a holder section, the holder section being movable along a rail between a first position and a second position;
a turning unit including a first end pivotally connected with the holder section of the driver, a second end and a middle section connected between the first and second ends;
a transmission unit having a pivoted end pivotally connected with the second end of the turning unit and an assembling end pivotally connected with a connection section; and
at least one elastic body disposed between the pivoted end and the assembling end, when the rotary shaft is rotated, the drive section, the driver and the turning unit being moved in response to the rotation of the rotary shaft, whereby the transmission unit drives the connection section to move;
wherein the transmission unit includes a first section and a second section for together driving the connection section to move, the pivoted end being disposed on the first section, the first section having an arm connected with the pivoted end, the pivoted end being pivotally connected with the second end of the turning unit via a bolt, the assembling end being disposed on the second section, the second section having a plate body connecting with the assembling end, the assembling end being connected with the connection section via a pin member, the plate body of the second section being provided with a guide section, the guide section having a head end and a rear end, the arm of the first section being provided with at least one restrictor, the restrictor being assembled in the guide section of the second section;
wherein the guide section is disposed on the plate body in an axial direction of the plate body, the restrictor being in the form of a bolt or a pin member, including a first restrictor and a second restrictor, the first restrictor abutting against the head end of the guide section, the second restrictor being positioned between the head end and the rear end of the guide section, the elastic body being a spiral spring, two ends of the elastic body being respectively affixed to the pivoted end of the first section and the assembling end of the second section.

4. A pivot shaft transmission device comprising,
at least one rotary shaft having a fixed section and a pivoted section, the pivoted section being assembled with a torque module;
a drive section disposed on the rotary shaft, the drive section being provided with a driving section;
a driver having a guide section assembled with the driving section and a holder section, the holder section being movable along a rail between a first position and a second position;
a turning unit including a first end pivotally connected with the holder section of the driver, a second end and a middle section connected between the first and second ends;
a transmission unit having a pivoted end pivotally connected with the second end of the turning unit and an assembling end pivotally connected with a connection section; and
at least one elastic body disposed between the pivoted end and the assembling end, when the rotary shaft is rotated, the drive section, the driver and the turning unit being moved in response to the rotation of the rotary shaft, whereby the transmission unit drives the connection section to move;
wherein the transmission unit includes a first section and a second section for together driving the connection section to move, the pivoted end being disposed on the first section, the first section having an arm connected with the pivoted end, the pivoted end being pivotally connected with the second end of the turning unit via a bolt, the assembling end being disposed on the second section, the second section having a plate body connecting with the assembling end, the assembling end being connected with the connection section via a pin member, the plate body of the second section being provided with a guide section, the guide section having a head end and a rear end, the arm of the first section being provided with at least one restrictor, the restrictor being assembled in the guide section of the second section;
wherein the first section is movable relative to the second section to extend the elastic body and make the restrictor move toward the rear end of the guide section, the allowable extension range of the elastic body being larger than a distance by which the restrictor moves toward the rear end of the guide section, the displacement amount of the first section being at least equal to a distance by which the restrictor moves toward the rear end of the guide section.

5. The pivot shaft transmission device as claimed in claim 3, wherein the first section is movable relative to the second section to extend the elastic body and make the restrictor move toward the rear end of the guide section, the allowable extension range of the elastic body being larger than a distance by which the restrictor moves toward the rear end of the guide section, the displacement amount of the first section being at least equal to a distance by which the restrictor moves toward the rear end of the guide section.

6. The pivot shaft transmission device as claimed in claim 1, wherein the connection section drivable by the transmission unit is a board body having two sides, a pin member being disposed on one side to connect with the assembling end of the transmission unit, a carrier body being affixed to the other side of the connection section, the carrier body being disposed on the apparatus body module of an electronic apparatus.

7. The pivot shaft transmission device as claimed in claim 2, wherein the connection section drivable by the transmission unit is a board body having two sides, a pin member being disposed on one side to connect with the assembling end of the transmission unit, a carrier body being affixed to the other side of the connection section, the carrier body being disposed on the apparatus body module of an electronic apparatus.

8. The pivot shaft transmission device as claimed in claim 1, wherein the rotary shaft is disposed on an electronic apparatus, the electronic apparatus including an apparatus body module and a display module, the rail being disposed on a fixing plate of the apparatus body module, the holder section of the driver being formed with a bolt hole, a bolt being passed through the bolt hole to assemble the holder section on the rail, the rail being a slot.

9. The pivot shaft transmission device as claimed in claim 2, wherein the rotary shaft is disposed on an electronic apparatus, the electronic apparatus including an apparatus body module and a display module, the rail being disposed on a fixing plate of the apparatus body module, the holder section of the driver being formed with a bolt hole, a bolt being passed through the bolt hole to assemble the holder section on the rail, the rail being a slot.

10. The pivot shaft transmission device as claimed in claim 8, wherein the rotary shaft includes a first rotary shaft and a second rotary shaft, the fixed section of the first rotary shaft being connected with and disposed on the fixing plate of the apparatus body module, the fixed section of the second rotary shaft being connected with and disposed on the display module, the drive section being disposed on the first rotary shaft, the first and second rotary shafts being enclosed in a subsidiary case, the subsidiary case together with a restriction plate and torque modules being installed in a case, the restriction plate being formed with two holes for the pivoted sections of the first and second rotary shafts to pass through respectively.

11. The pivot shaft transmission device as claimed in claim 9, wherein the rotary shaft includes a first rotary shaft and a second rotary shaft, the fixed section of the first rotary shaft being connected with and disposed on the fixing plate of the apparatus body module, the fixed section of the second rotary shaft being connected with and disposed on the display module, the drive section being disposed on the first rotary shaft, the first and second rotary shafts being enclosed in a subsidiary case, the subsidiary case together with a restriction plate and torque modules being installed in a case, the restriction plate being formed with two holes for the pivoted sections of the first and second rotary shafts to pass through respectively.

12. The pivot shaft transmission device as claimed in claim 10, wherein a link unit is disposed between the first and second rotary shafts for synchronously rotating the first and second rotary shafts, a section of each of the first and second rotary shafts in adjacency to the pivoted section being formed with a spiral groove, protrusion sections being disposed at two ends of the link unit corresponding to the spiral grooves, the protrusion sections being respectively inlaid in the spiral grooves.

13. The pivot shaft transmission device as claimed in claim 1, wherein the drive section is a tubular body having a shaft hole in which the first rotary shaft is fitted, the driving section being formed on a surface of the drive section, the driving section being a groove structure including a straight section and an oblique section connected with the straight section.

14. The pivot shaft transmission device as claimed in claim 2, wherein the drive section is a tubular body having a shaft hole in which the first rotary shaft is fitted, the driving section being formed on a surface of the drive section, the driving section being a groove structure including a straight section and an oblique section connected with the straight section.

15. The pivot shaft transmission device as claimed in claim 6, wherein the drive section is a tubular body having a shaft hole in which the first rotary shaft is fitted, the driving section being formed on a surface of the drive section, the driving section being a groove structure including a straight section and an oblique section connected with the straight section.

16. The pivot shaft transmission device as claimed in claim 8, wherein the drive section is a tubular body having a shaft hole in which the first rotary shaft is fitted, the driving section being formed on a surface of the drive section, the driving section being a groove structure including a straight section and an oblique section connected with the straight section.

17. The pivot shaft transmission device as claimed in claim 10, wherein the drive section is a tubular body having a shaft hole in which the first rotary shaft is fitted, the driving section being formed on a surface of the drive section, the driving section being a groove structure including a straight section and an oblique section connected with the straight section, one end of the drive section being provided with a shoulder section and an insertion block formed on the shoulder section, the insertion block being inlaid in a hole formed on the restriction plate.

18. The pivot shaft transmission device as claimed in claim 12, wherein the drive section is a tubular body having a shaft hole in which the first rotary shaft is fitted, the driving section being formed on a surface of the drive section, the driving section being a groove structure including a straight section and an oblique section connected with the straight section, one end of the drive section being provided with a shoulder section and an insertion block formed on the shoulder section, the insertion block being inlaid in a hole formed on the restriction plate.

19. The pivot shaft transmission device as claimed in claim 13, wherein the driver is formed with an arched section corresponding to the tubular body of the drive section, the guide section being disposed on the arched section, the guide section having the form of a key, the guide section being inlaid in the driving section.

20. The pivot shaft transmission device as claimed in claim 14, wherein the driver is formed with an arched section corresponding to the tubular body of the drive section, the guide section being disposed on the arched section, the guide section having the form of a key, the guide section being inlaid in the driving section.

21. The pivot shaft transmission device as claimed in claim 15, wherein the driver is formed with an arched section corresponding to the tubular body of the drive section, the guide section being disposed on the arched section, the guide section having the form of a key, the guide section being inlaid in the driving section.

22. The pivot shaft transmission device as claimed in claim 17, wherein the driver is formed with an arched section corresponding to the tubular body of the drive section, the guide section being disposed on the arched section, the guide section having the form of a key, the guide section being inlaid in the driving section.

23. The pivot shaft transmission device as claimed in claim 1, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

24. The pivot shaft transmission device as claimed in claim 2, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

25. The pivot shaft transmission device as claimed in claim 6, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

26. The pivot shaft transmission device as claimed in claim 8, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

27. The pivot shaft transmission device as claimed in claim 10, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

28. The pivot shaft transmission device as claimed in claim 12, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

29. The pivot shaft transmission device as claimed in claim 13, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

30. The pivot shaft transmission device as claimed in claim 14, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

31. The pivot shaft transmission device as claimed in claim 15, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

32. The pivot shaft transmission device as claimed in claim 17, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

33. The pivot shaft transmission device as claimed in claim 19, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

34. The pivot shaft transmission device as claimed in claim 20, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

35. The pivot shaft transmission device as claimed in claim 21, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

36. The pivot shaft transmission device as claimed in claim 22, wherein the turning unit is an L-shaped plate body, each of the first end, the second end and the middle section of the turning unit being formed with an assembling hole, a bolt being passed through the assembling hole of the first end to connect the turning unit to the holder section of the driver, the assembling hole of the second end being pivotally connected with the pivoted end of the transmission unit, the assembling hole of the middle section being pivotally connected on a fixing plate as a motional fulcrum.

* * * * *